May 29, 1962

A. ZIMPEL 3,036,696

METHOD OF PRODUCING SEAMLESS TUBULAR ARTICLES

Filed Feb. 24, 1959

INVENTOR.
ADOLF ZIMPEL
BY
Mestern & Rollin
ATTORNEYS

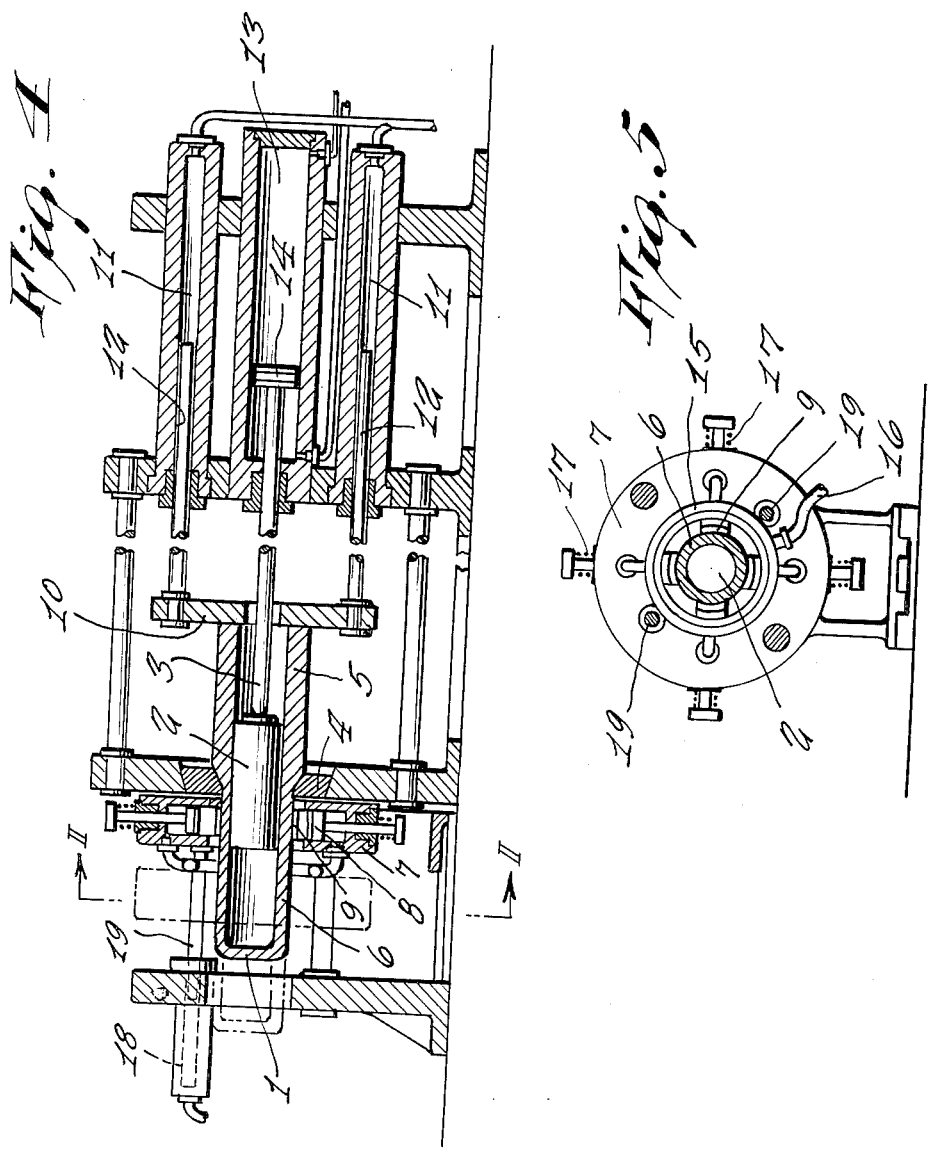

United States Patent Office 3,036,696
Patented May 29, 1962

3,036,696
METHOD OF PRODUCING SEAMLESS
TUBULAR ARTICLES
Adolf Zimpel, Dusseldorf-Reisholz, Germany, assignor to Stahl- und Rohrenwerk Reisholz G.m.b.H., Dusseldorf-Reisholz, Germany
Filed Feb. 24, 1959, Ser. No. 795,049
8 Claims. (Cl. 205—7)

The length of hollow tubular bodies obtainable in the pressing and drawing process, especially those of larger diameter, has heretofore been limited by the fact that the tools employed, especially the mandrel, become increasingly heavy and hard to handle, with increasing length.

Furthermore, because of the heat loss caused by the mandrel filling the entire interior of the hollow body, a certain drawing speed has to be maintained, which easily reaches undesirable heights, especially in the production of hollow bodies having a small wall thickness in comparison to the diameter.

The hydraulic presses used according to the known pressing and drawing processes for the production of larger hollow bodies and tubes are of exceedingly great length, not only because the complete pressing stroke must approximately correspond to the full length of the finished hollow body but also because the necessary stripping device requires space in linear extension. Furthermore the costs of the tools, especially that of the mandrel, the means for obtaining the required high shaping speed, the means for producing heat in the work piece and the other devices have set comparatively narrow limits to the production of long, large hollow bodies and tubes according to the pressing and drawing process. Finally, the difficulties connected with the stripping of the finished hollow body from the mandrel grow in proportion to the length and are inversely proportional to the relationship of wall thickness and diameter of the hollow body.

It could be attempted, instead of driving the mandrel forward simultaneously with the work piece, while constantly applying the mandrel head to the bottom of the latter, as has been customary in warm drawing, to constantly impart reciprocating axial movement to the mandrel in the manner known in cold drawing of tubes, and to simultaneously exert a drawing motion on the workpiece end protruding from the last workpiece. The advantage thus obtained would reside in the fact that the mandrel would not need to be of the same length as the tube or the like to be produced, but would have to be only as long as the zone of the shaping pressure acting upon it, with the addition of the stroke of its pendulum motions. Consequently it would adhere to the workpiece only in the shaping area and the workpiece would not lose any heat through the mandrel at other places. Furthermore, the tool costs would be considerably decreased and the effective mandrel part could be exchangeably connected with the mandrel rod. Beyond the decrease in tool costs, an improved adjustability with regard to dimensions as well as with regard to the selection of material would result. Furthermore, devices and driving forces in particular for stripping the finished hollow body from the mandrel would be eliminated, because the former would be withdrawn step-wise from the shaped tube part, in contrast to the later stripping, at a time when the workpiece can still be supported rearward with its unshaped or only slightly shaped portion.

On the other hand, nothing would be gained with regard to the shortening of the construction length required for the blow or draw bench, because in the known cold drawing devices the tube is gripped at its end, emerging from the last tool, from outside, and pulled forward step-wise to its full length. The means required therefor thus take up space corresponding to at least the length of the finished tube, thus further increasing the length of the device.

Moreover, the length of the drawing device also limits the length of the tubes that can be produced on a blow or drawing bench provided therewith.

Furthermore, the drawing action exerted upon the extreme end of the tool might have a disadvantageous effect on warm workpieces, insofar as this drawing action causes an undesirable stretching of the finished tube portion.

The present invention has for its object the exploitation of the described advantages of step-wise pulling of tubes over a mandrel, which are already known from cold drawing processes, and in which the workpiece is exposed to a drawing force acting upon its end emerging from the shaping tool, and in which the mandrel moves in the same direction with respect to the drawing tool during each drawing motion, returning to its starting position after each drawing motion, while at the same time avoiding the disadvantages of known processes of this kind. According to the invention, the drawing force is not permitted to act upon the foremost end of the workpiece, but is instead, compelled to exert a radially inwardly directed pressure upon the portion of the workpiece located beyond and adjacent the tool or die which surrounds the forward end of the mandrel, the latter projecting beyond the shaping tool in the region of this radial pressure, thereby applying the drawing force of the mandrel to the workpiece by friction at the pressed zone.

Thus the workpiece is always supported against inward pressure by a portion of the mandrel located inside, and is therefore not exposed to the danger of undesirable distortion under such pressure. Furthermore the drawing force always grips the workpiece immediately behind the shaping tool or die, thereby avoiding undesirable stretching of the already finished tube portion. The pressure acting radially against the tube and the forward end of the mandrel from without effects frictional interengagement of the tube and the reciprocation mandrel, under the influence of which the mandrel carries along the tube every time it advances.

The pressure effecting the necessary friction between the tube and the mandrel can be exerted in different ways, as for example, by heat shrinking the finished workpiece end on the forward end of the mandrel. This heat shrinking can be easily attained by sudden cooling of one part of the finished tube end, but it is very often attained automatically as a consequence of the normal cooling off of the tube.

In order to prevent the tube from being moved along in the rearward direction every time the mandrel moves back, the workpiece must be supported at its still unshaped end against the return force of the mandrel in known manner, at least for the duration of its rearward stroke. The means serving to support the tube are also known per se.

The radial pressure necessary for making the advancing mandrel move the tube along can be attained also in a mechanical manner, e.g. with the help of a ring placed around the zone of the workpiece enclosing the forward end of the mandrel just beyond the die, which is reciprocated simultaneously with the mandrel and in which hydraulic pistons and pressure dies are arranged for applying radial pressure against the workpiece. These are pressed against the tube every time the mandrel advances and loosened or lifted off during the return of the ring and the mandrel. When such a ring is employed, it is possible to drive only the mandrel in heretofore known manner, so as to advance the ring; the tube, the ring and the mandrel are thereby advanced simultaneously. In this case, the return of the mandrel can be effected in a manner known per se. It is also possible to provide common drive means for the ring and the mandrel.

In the accompanying drawing:

FIG. 4 is a schematic representation of the device of the invention; and

FIG. 5 is a section through the device according to FIG. 4 on line II—II.

Figure 1:
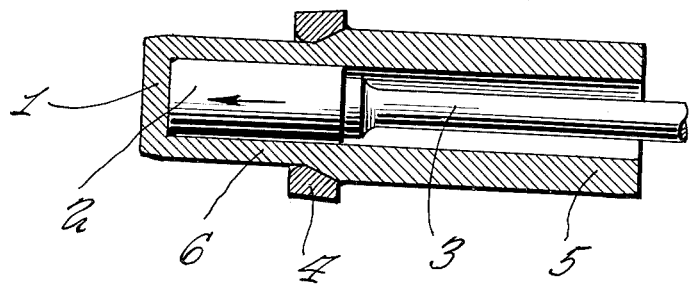
FIGS. 1 and 2 illustrate the process constituting the subject matter of the invention in principle, in two process steps.

In the first process step according to FIG. 1 the short mandrel 2, which is attached to the forward end of the mandrel rod 3 and has its forward portion in engagement with the closed end 1 of the tube bloom 5, has pushed the forward end of the tube bloom through the drawing die 4, to such an extent that the rear portion of the mandrel is located in the area of the shaping pressure exerted by the drawing die 4. At the same time, the forward end of the bloom 5 was stretched into the tube 6.

Figure 2:
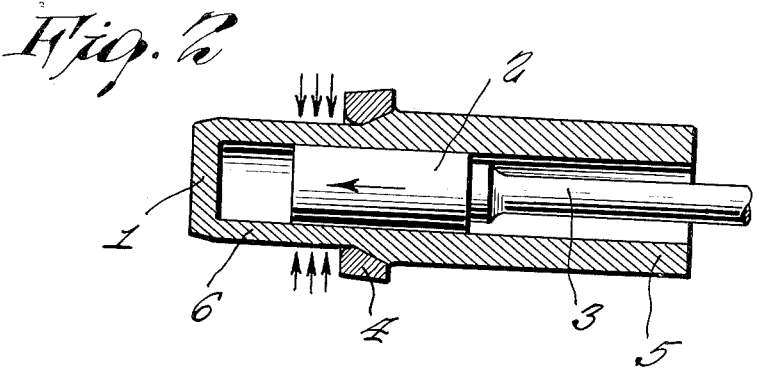

In FIG. 2 the mandrel 2 has been pulled back from the position shown in FIG. 1 relative to the tube bloom 5 and to the drawing die 4, so that only its forward end protrudes beyond the drawing die 4. At the beginning of the second and each successive forward movement of the mandrel, radial pressure, as indicated by the arrows, is exerted upon the tube zone beyond but adjacent the drawing die and surrounding the mandrel end protruding beyond the drawing die. When, during the next forward stroke, the mandrel has moved the workpiece further through the drawing die under the effect of that pressure, the mandrel is again returned by the same distance as that by which it advanced, while the rear end of the tube is supported. The pressure directed radially against the tube is removed upon the termination of the forward stroke of the mandrel.

Figure 3:
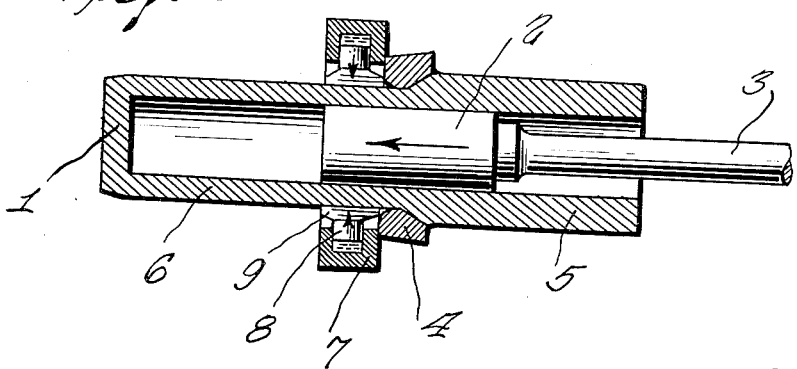
FIG. 3 is an embodiment of a device employed in the execution of the process.

In the device illustrated by way of example in FIG. 3, a ring 7 enclosing the tube portion located just beyond the drawing die 4, is disposed adjacent the latter. In that ring hydraulically operable pistons 8 are movable radially toward the mandrel axis to exert the requisite radial pressure against the tube and the mandrel via the pressure dies 9. The ring 7 is returned to its starting position with the help of a transmission (not shown), simultaneously with the returning mandrel 2, after each partial drawing action. The advancing force can act either upon the mandrel and the ring or only upon one of these, that is to say either the ring or the mandrel may be positively driven in axial direction or, alternatively, a common drive means may be provided for both of these. In the latter case, care must be taken that the part which is not driven is also returned to its starting position while the driven part moves back.

The plate 10 in FIG. 4 serves to prevent rearward displacement of the workpiece 5 during the return movement of the mandrel 2, and is brought to bear upon the rear end of the workpiece 5 by the pistons 12 movable in the two cylinders 11. The reciprocating motion of the mandrel 2 with the mandrel rod 3 is effected by the piston 14 movable in the cylinder 13.

The ring 7 has four pressure dies 9, according to FIG. 5, which are movable radially toward and away from the mandrel axis by means of pistons 8 and exert the required radial pressure against the tube and the mandrel. The cylinders of pistons 8 are interconnected by a ring circuit and, in a conventional manner, are supplied with pressure medium by means of a resilient conduit 16. After each partial drawing displacement of the mandrel the pressure dies 9 are lifted from the tube by the springs 17 and the ring 7, which is actuated by pistons 19 movable in hydraulic cylinders 18, returns to the starting position synchronously with the returning mandrel 2, the cylinder 18 being, of course, charged with fluid simultaneously with the introduction of fluid into the cylinder 13 at the left hand side thereof (FIG. 4). The conjoint actuation of cylinders 13, 13 and piston 8 is effected by suitable valve means known per se.

When the drawing process is terminated, the mandrel 2 is drawn back to the starting position by means of pistons 14 in order to receive a new perforated piece 5. The supporting push rod 10 is thus also taken along by the rear ring surface of the mandrel 2.

What I claim is:

1. A method of producing a seamless tube from a hot hollow blank of ductile material, comprising the steps of:
   (a) pressing a forward portion of said blank through an annular forming die with the aid of a mandrel inserted into said blank;
   (b) applying a radial pressure to said forward portion of said blank, thereby temporarily clamping it against said mandrel at a location just beyond said die;
   (c) drawing a successive portion of said blank through said die by displacing said mandrel axially in a forward direction, while said blank is clamped to said mandrel;
   (d) reciprocating said mandrel axially while applying said radial pressure to said blank at said location during each forward stroke of said mandrel, and maintaining said pressure for substantially the entire duration of each forward stroke and thereby drawing successive portions of said blank through said die; and
   (e) securing said blank against displacement in rearward direction during each rearward stroke at a location rearwardly of said die.

2. A method of producing a seamless tube from a hot hollow blank of ductile material, comprising the steps of:
   (a) pressing a forward portion of said blank through an annular forming die with the aid of a mandrel inserted into said blank;
   (b) applying a radial pressure to said forward portion of said blank, thereby temporarily clamping it against said mandrel at a location beyond said die;
   (c) drawing a successive portion of said blank through said die by displacing said mandrel axially in a forward direction, while said blank is clamped to said mandrel;
   (d) reciprocating said mandrel axially while applying said radial pressure to said blank at said location during each forward stroke of said mandrel, and maintaining said pressure for substantially the entire duration of each forward stroke and releasing said pressure during each rearward stroke thereof, thereby drawing successive portions of said blank through said die; and
   (e) securing said blank against displacement in rearward direction during each of said rearward strokes at a location rearwardly of said die.

3. A method of producing a seamless tube from a hot hollow blank of ductile material, comprising the steps of:
   (a) pressing a forward portion of said blank through an annular forming die with the aid of a mandrel inserted into said blank;
   (b) applying a radial pressure to said forward portion of said blank, thereby temporarily clamping it against said mandrel at a location beyond said die by cooling said blank at said location and shrinking it onto said mandrel;
   (c) drawing a successive portion of said blank through said die by displacing said mandrel axially in a forward direction, while said blank is clamped to said mandrel;

(d) reciprocating said mandrel axially while applying said radial pressure to said blank at said location during each forward stroke of said mandrel, maintaining said pressure for substantially the entire duration of each forward stroke and releasing said pressure during each rearward stroke thereof, thereby drawing successive portions of said blank through said die; and (e) securing said blank against displacement in rearward direction during each of said rearward strokes at a location rearwardly of said die.

4. A method of producing a seamless tube from a hot hollow blank of ductile material, comprising the steps of:

(a) pressing a forward portion of said blank through an annular forming die with the aid of a mandrel inserted into said blank;

(b) applying a radial pressure externally to said forward portion of said blank, thereby temporarily clamping it against said mandrel at a location beyond said die;

(c) drawing a successive portion of said blank through said die by displacing said mandrel axially in a forward direction, while said blank is clamped to said mandrel;

(d) reciprocating said mandrel axially while applying said radial pressure to said blank at said location during each forward stroke of said mandrel, and maintaining said pressure for substantially the entire duration of each forward stroke, and releasing said pressure during each rearward stroke thereof, thereby drawing successive portions of said blank through said die; and (e) securing said blank against displacement in rearward direction during each of said rearward strokes at a location rearwardly of said die.

5. A method of producing a seamless tube from a hot hollow blank of ductile material, comprising the steps of:

(a) pressing a forward portion of said blank through an annular forming die with the aid of a mandrel inserted into said blank;

(b) applying a radial pressure externally to said forward portion of said blank, thereby temporarily clamping it against said mandrel at a location just beyond said die;

(c) drawing a successive portion of said blank through said die by displacing said mandrel axially in a forward direction, while said blank is clamped to said mandrel;

(d) reciprocating said mandrel axially while applying said radial pressure to said blank at said location during each forward stroke of said mandrel, and maintaining said pressure for substantially the entire duration of each forward stroke, thereby drawing successive portions of said blank through said die; and (e) securing said blank against displacement in rearward direction during each rearward stroke at a location rearwardly of said die.

6. An apparatus for drawing seamless tubes from hot hollow blanks of ductile material, comprising a base, a draw-forming die mounted on said base for forming a tube from a blank drawn through said die, a mandrel member axially reciprocably mounted on said base insertable into said blank for forcing a forward portion thereof through said die upon forward displacement of said mandrel member, an annular support member axially shiftable on said base and disposed forwardly of said die, a plurality of hydraulic pistons radially displaceable on said support member for applying radial pressure to portions of said blank extending forwardly of said die, thereby clamping said portions against said blank, first drive means for axially reciprocating at least one of said members, second drive means operable during the forward stroke of said one of said members for actuating said pistons, thereby entraining along with said one member a clamped portion of said blank and the other of said members whereby successive portions of said blank are drawn through said die upon successive forward strokes, and for deactivating said pistons during the rearward stroke of said one member, and stop means engaging said blank rearwardly of said die and operable during said rearward stroke for preventing displacement of said blank.

7. An apparatus for drawing seamless tubes from hot hollow blanks of ductile material, comprising a base, a draw-forming die mounted on said base for forming a tube from a blank drawn through said die, a mandrel member axially reciprocably mounted on said base insertable into said blank for forcing a forward portion thereof through said die upon forward displacement of said mandrel, an annular support axially shiftable on said base and disposed forwardly of said die, a plurality of hydraulic pistons radially displaceable on said support for applying radial pressure to portions of said blank extending forwardly of said die, thereby clamping said portions against said blank, first drive means for axially reciprocating said mandrel, second drive means operable during the forward stroke of said mandrel for actuating said pistons, thereby entraining along with said mandrel a clamped portion of said blank and said support whereby successive portions of said blank are drawn through said die upon successive forward strokes, and for deactivating said pistons during the rearward stroke of said mandrel, and stop means engaging said blank rearwardly of said die and operable during said rearward stroke for preventing rearward displacement of said blank.

8. An apparatus for drawing seamless tubes from hot hollow blanks of ductile material, comprising a base, a draw-forming die mounted on said base for forming a tube from a blank drawn through said die, a mandrel member axially reciprocably mounted on said base insertable into said blank for forcing a forward portion thereof through said die upon forward displacement of said mandrel, an annular support axially shiftable on said base and disposed forwardly of said die, a plurality of hydraulic pistons radially displaceable on said support for applying radial pressure to portions of said blank extending forwardly of said die, thereby clamping said portions against said blank, first drive means for axially reciprocating said support, second drive means operable during the forward stroke of said support for actuating said pistons, thereby entraining along with said support a clamped portion of said blank and said mandrel whereby successive portions of said blank are drawn through said die upon successive forward strokes, and for deactivating said pistons during the rearward stroke of said support, means for displacing said mandrel in rearward direction upon deactivation of said pistons, and stop means engaging said blank rearwardly of said die and operable during said rearward stroke for preventing rearward displacement of said blank.

References Cited in the file of this patent

UNITED STATES PATENTS

| | | |
|---|---|---|
| 926,898 | Rockwell | July 6, 1909 |
| 1,654,585 | Fulton | Jan. 3, 1928 |
| 1,917,708 | Giesler | July 11, 1933 |
| 1,925,035 | Giesler | Aug. 29, 1933 |
| 1,948,437 | Bowers | Feb. 20, 1934 |
| 2,008,600 | Smith | July 16, 1935 |
| 2,194,488 | Whitehouse | Mar. 26, 1940 |
| 2,270,398 | Westin | Jan. 20, 1942 |
| 2,549,705 | Offutt | Apr. 17, 1951 |

OTHER REFERENCES

Making, Shaping and Treating of Steel (U.S. Steel, 7th ed., 1957, pp. 767–770).